H. A. CARPENTER AND A. W. WARNER.
APPARATUS FOR CHARGING GAS PRODUCERS.
APPLICATION FILED JULY 13, 1915.

1,322,877.

Patented Nov. 25, 1919.
4 SHEETS—SHEET 1.

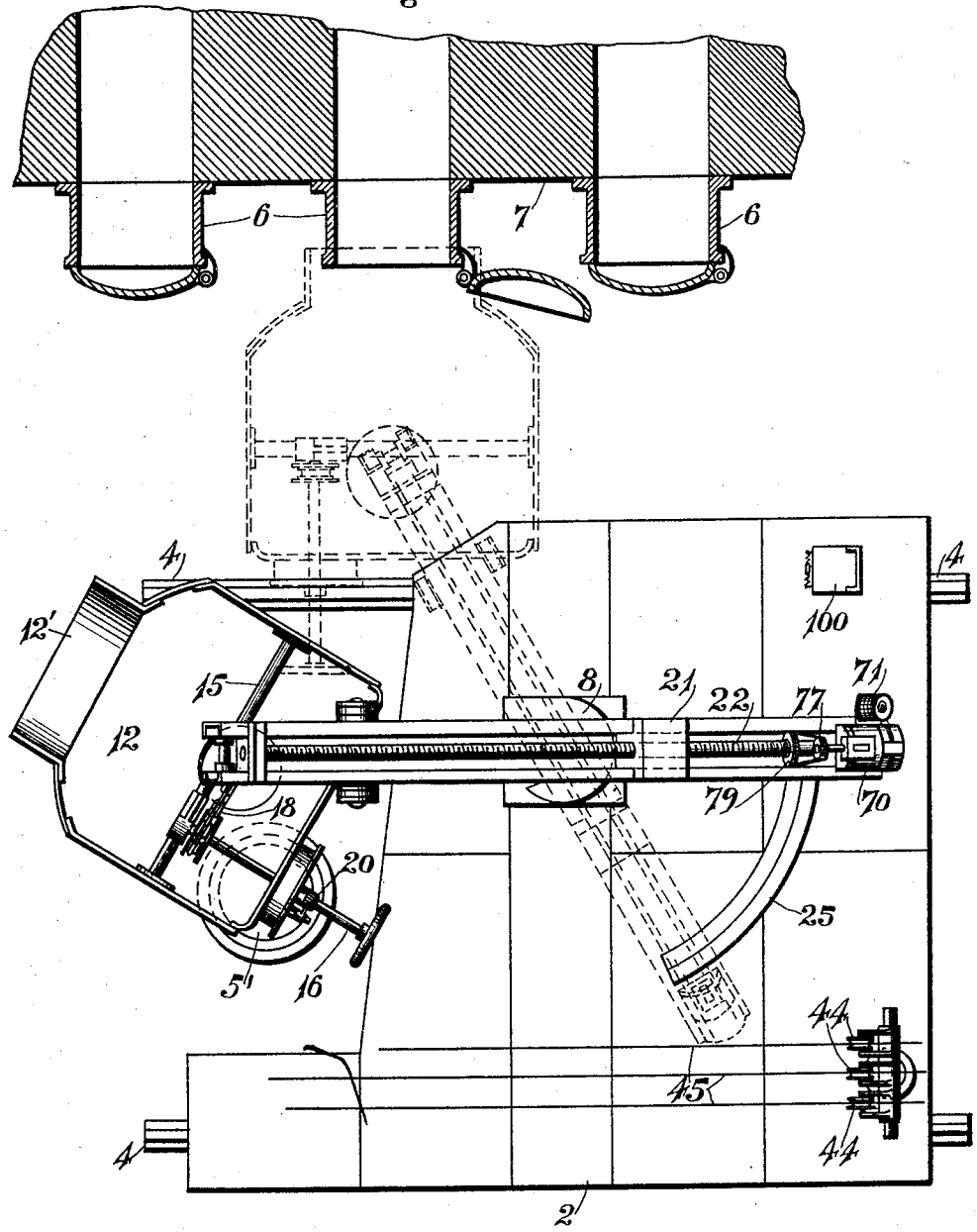

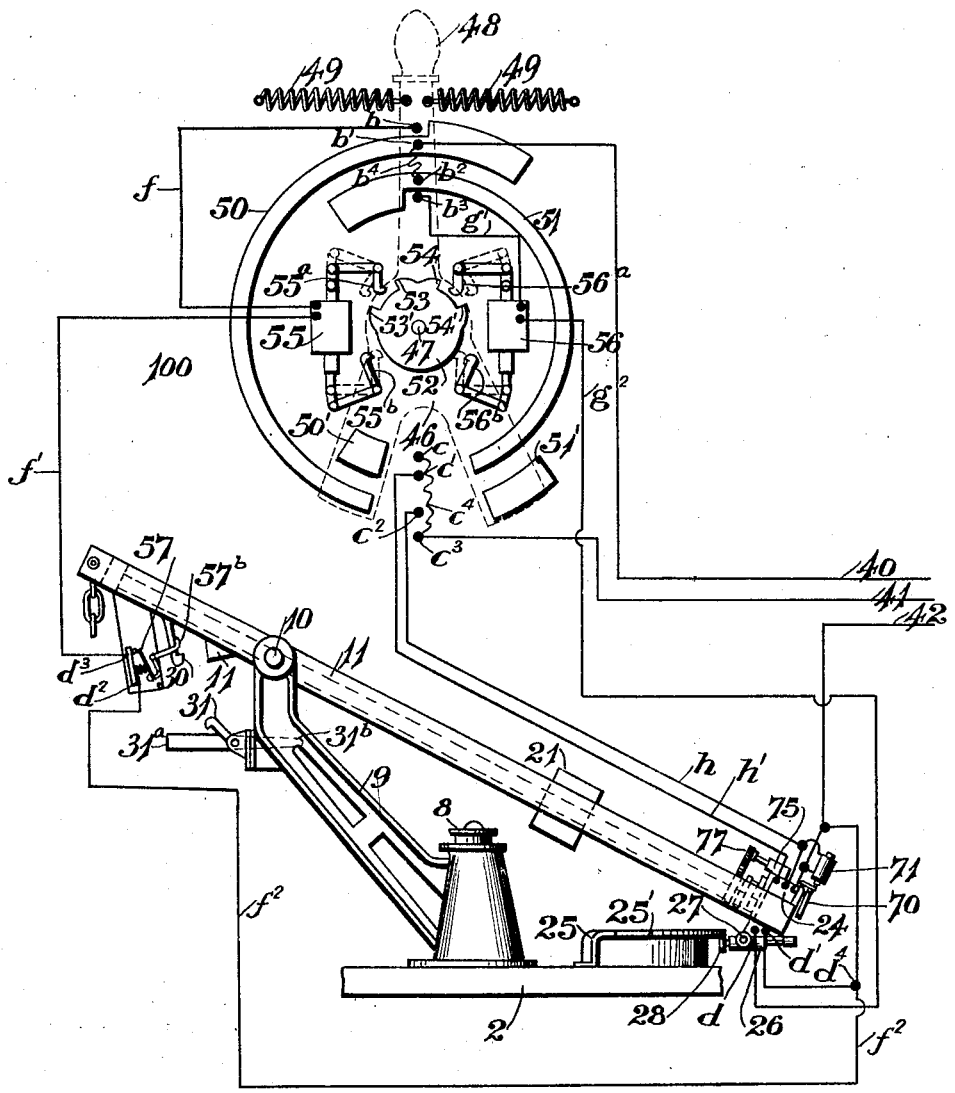

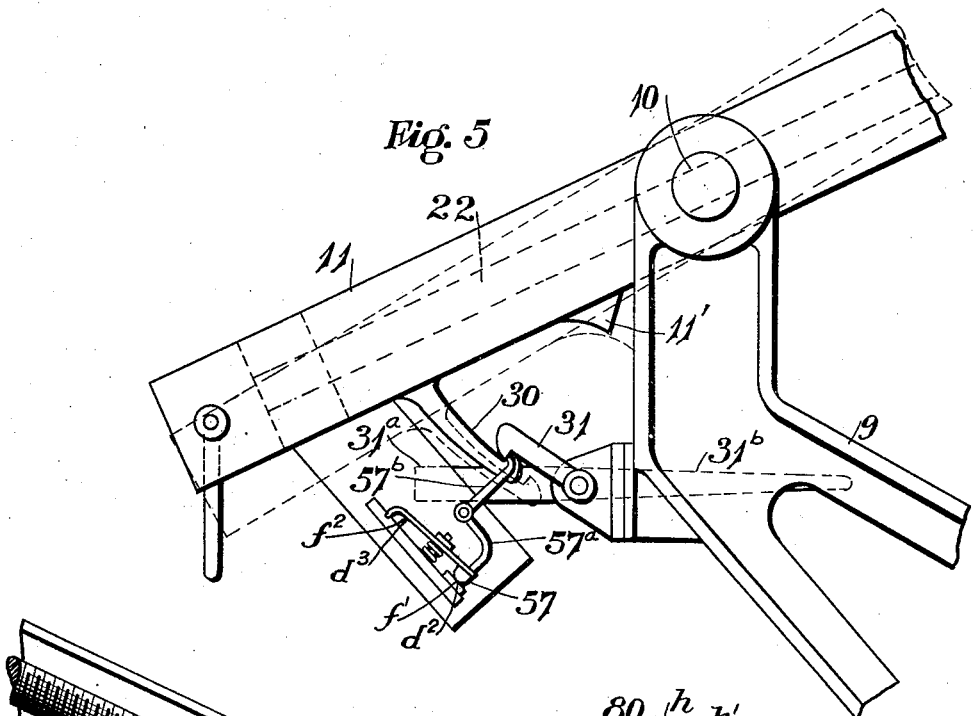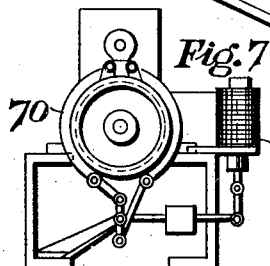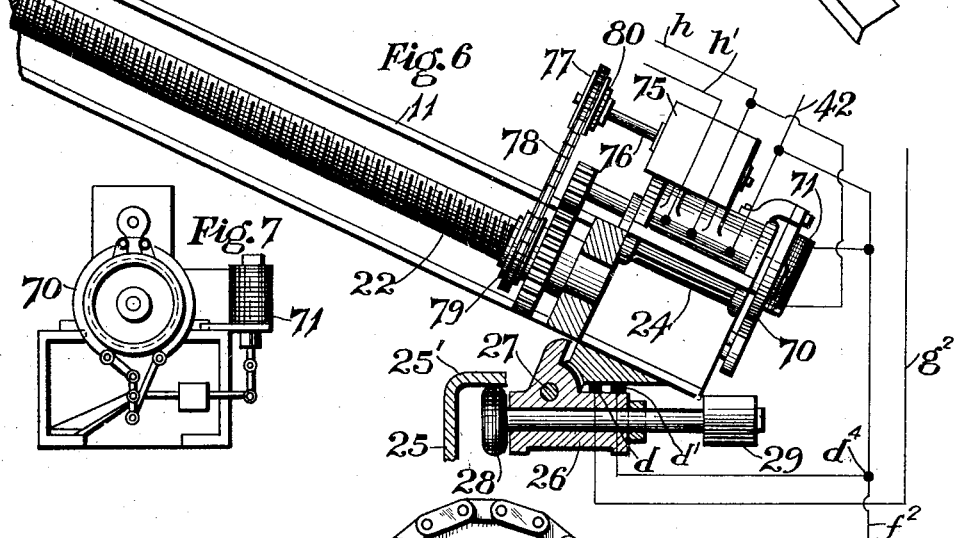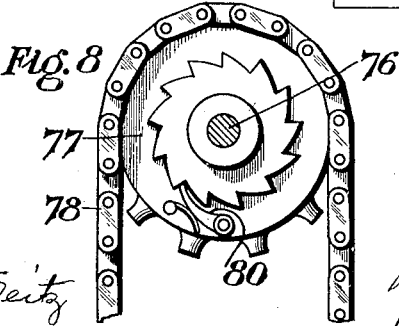

UNITED STATES PATENT OFFICE.

HENRY A. CARPENTER AND ARTHUR W. WARNER, OF SEWICKLEY, PENNSYLVANIA, ASSIGNORS TO RITER-CONLEY MANUFACTURING COMPANY, OF PITTSBURGH, PENNSYLVANIA, A CORPORATION OF NEW JERSEY.

APPARATUS FOR CHARGING GAS-PRODUCERS.

1,322,877. Specification of Letters Patent. Patented Nov. 25, 1919.

Application filed July 13, 1915. Serial No. 39,710.

*To all whom it may concern:*

Be it known that we, HENRY A. CARPENTER and ATRHUR W. WARNER, citizens of the United States, residing at Sewickley, county of Allegheny, and State of Pennsylvania, have invented certain new and useful Improvements in Apparatus for Charging Gas-Producers, of which the following is a specification.

In plants for manufacturing coal gas a portion of the residual coke is commonly consumed in the generation of gas for operating the plant, the coke from the upper retorts of the bench being most conveniently available for this purpose. Heretofore, no means has been provided for keeping track of this coke consumption in such manner as to insure economic operation of the producers. With the producer charger under the control of a competent and careful operator a fair degree of efficiency is of course possible with former methods which, however, provide no means for accurately determining either the amount of coke consumed, or for recording the charging periods.

One object of the present invention is to provide a producer charging apparatus which weighs and registers the weight of all coke fed to the producers, and also provides a record whereby the amount of coke charged into the producers in any given interval of time may be ascertained.

A further object is to provide charging mechanism of improved construction for facilitating the transfer of coke to the producers, the manual work necessary for this operation being reduced to a minimum.

In the adaptation of the invention herein disclosed, the mechanical operations which result in minimizing the manual work are operations which accomplish the weighing of the coke and the registration of such weight, and this register operates in conjunction with a time clock recorder of usual type, whereby the amount of coke withdrawn from the retorts or other fuel source during any given time interval, and the amount charged into the producers, may be registered. This linking of the operations results from the use of an adjustably counter-weighted transfer receptacle which is most readily manipulated when balanced for accomplishing the necessary movements back and forth relatively to the producer, and the operation incident to balancing under varying conditions of load is utilized for ascertaining and registering the weight of the coke transferred. A further object is to so control the motor which adjusts the poise or counterweight that it can be operated only in a direction which will result in moving it toward and into balancing position, movement in an opposite direction being rendered impossible, and movement beyond a substantially balancing position being prevented under normal operation. With a properly graduated machine, the movements of the poise are thus available for accurately determining and registering the coke consumption of the producers.

While it is the prime purpose of the apparatus as here embodied to balance the charging receptacle for the purpose above stated, it will be understood that the invention contemplates means for balancing the same in connection with any use, manipulation or operation for which such balancing may be useful, and regardless of whether the transfer receptacle is filled or loaded from a retort or from some other fuel source.

In the accompanying drawings,

Fig. 2 is a top plan view of the same with portions of some of the retorts of the gas bench shown in section, the transfer mechanism being shown in full lines in an intermediate position, and in dotted lines in position to receive coke from a retort.

Fig. 3 is a diagrammatic view illustrating the electric circuits and the motor controller.

Fig. 5 is a detail view of the latch mechanism for the load-supporting end of the beam and the circuit-closing means associated therewith.

Fig. 6 is a detail view of the combined latch and circuit controlling device carried by the free end of the beam.

Fig. 7 is an end elevation of the beam and motor, illustrating the brake device.

Fig. 8 is a detail view of the ratchet pinion for actuating the register.

Figure 1:
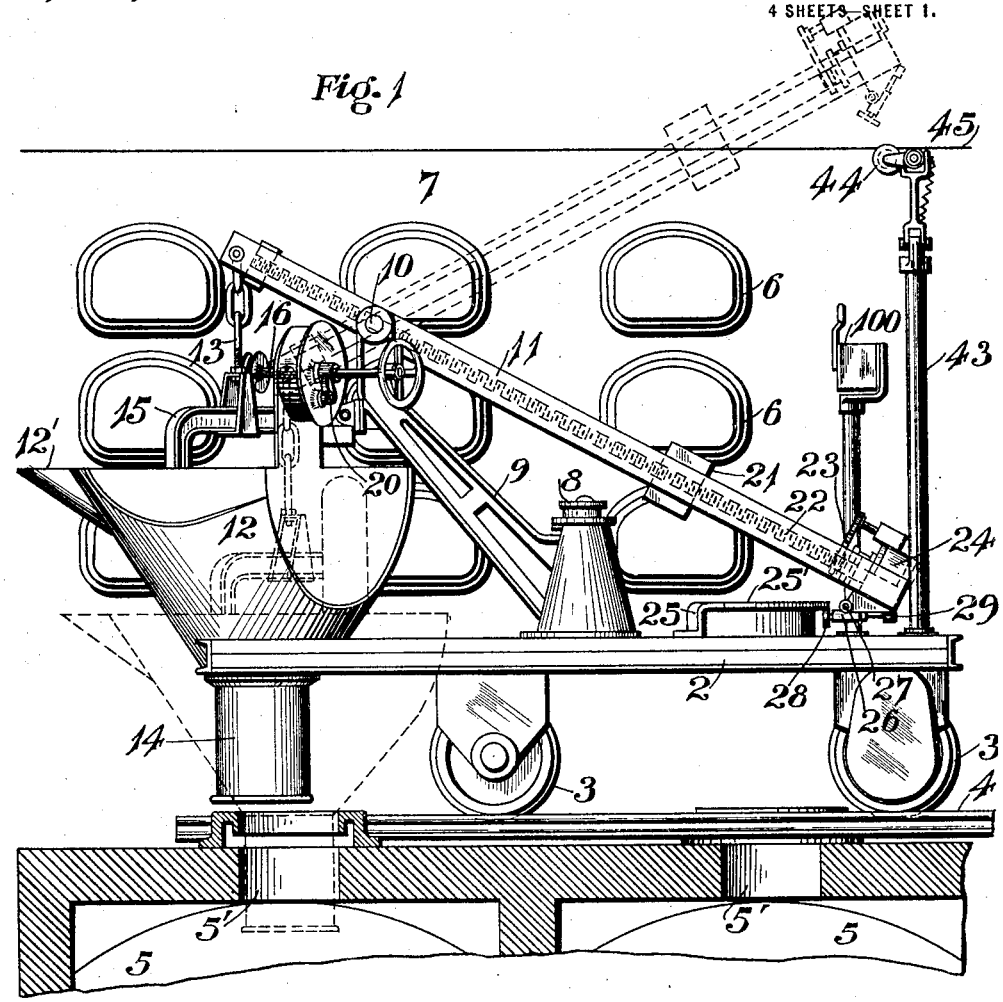
Figure 1 is an elevation of the improved producer-charging mechanism, the transfer receptacle being shown raised in full lines, and depressed into producer-charging position in dotted lines.
Figure 4:
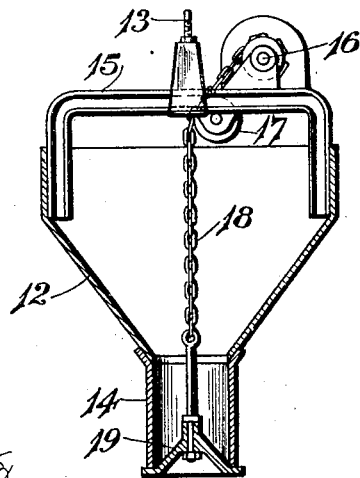
Fig. 4 is a sectional detail of the transfer receptacle and the mechanism for operating its discharge-controlling bell.

Referring to the drawings, 2 designates a car platform having its wheels 3 mounted to travel on track 4 which is superposed on a battery of gas producers 5. Any suitable motive means, not shown, may be employed for moving this platform car as required for positioning it relatively to the gas producers and to retorts 6 of a gas bench 7, the bench being located at one side of the producers and with the latter adapted to be charged from the upper retorts of the bench in accordance with the usual practice.

A post 8 is mounted on platform 2 and rotatable, thereon about a vertical axis, is an upwardly inclined mast 9. Mounted on a horizontal fulcrum 10 at the upper end of the mast is a vertically swinging beam 11. A hopper-like bucket or transfer receptacle 12 is suspended from the shorter end of the beam by chain 13, and the mast 9 may be so rotated horizontally and the beam so turned on its fulcrum as to present the receptacle beneath a retort 6 for receiving a charge of coke, as in dotted lines in Fig. 2, and for laterally turning the receptacle and depressing it into producer-charging position, as in dotted lines in Fig. 1.

Referring to the transfer receptacle in detail, one side of its upper portion is enlarged at 12′ to project beneath the retort mouth-piece. The lower portion 14 of the receptacle is of spout form to fully enter the charging hole 5′ of a producer, as shown in dotted lines in Fig. 1, and by this means the coke is prevented from spilling over the top of the producer, a defect in producer charges as now generally constructed. Supporting chain 13 is secured to the receptacle through the medium of the bail-shaped bar 15, and this bar provides a support and bearing for one end of the hand-operated shaft 16 and guide sheave 17 for chain 18 which extends downwardly through the receptacle for raising and lowering bell 19 at the bottom of spout 14, the hand-operated shaft 16 being locked by ratchet 20 with the bell closed or partially open, as desired. The bell effectually spreads the fuel as it discharges into the producer.

For balancing beam 11 under all conditions of load, the poise 21 is operatively connected to a screw-shaft 22 in such manner as to cause the poise to travel in the direction of length of the beam by the rotation of shaft 22, said shaft 22 extending longitudinally of and journaled in the beam, the shaft being geared at 23 to a reversible electric motor 24. As here shown, the motor is mounted on beam 11, being preferably located at the extremity of its free portion. For holding the free portion of the beam depressed and receptacle 12 raised in position to be filled from a retort, a curved bar 25, flanged laterally at 25′, is secured to the platform 2, and coöperating therewith is a latch device 26 which is pivoted between its ends at 27 to the under side of the free extremity of beam 11. The lighter end of the latch carries a roller 28 which moves beneath flange 25′ of bar 25, and carried by the heavier end of the latch is the counterweight 29. With the latch in engagement with the bar as in Fig. 6, the receptacle-supporting end of the beam is prevented from lowering, being so held until poise 21 has been adjusted to place the beam in balance in manner presently to be described. After the loaded beam has been balanced, it may be readily turned by the operator from the dotted line position of Fig. 2 to the full line position of that figure for alining the receptacle with the producer filling hole 5′, and when so moved, latch 26 is clear of bar 25 so that the beam may be tilted to lower the receptacle into producer-charging position, as in dotted lines in Fig. 1, an operation readily provided manually, since the beam is balanced regardless of the load weight in the bell. When the beam is tilted into producer-charging position, a hook 30 depending therefrom automatically engages the pivoted weighted latch 31 mounted on mast 9, so that when receptacle 12 is relieved of all or part of its load and the beam thrown out of balance, the hook and latch will continue to hold it in producer-charging position until poise 21 has been shifted to again place the beam in balance, whereupon it is again in condition to be easily manipulated by the operator. This arrangement of parts places a movement-restraining element at each end of the beam temporarily active when the beam is in predetermined positions, the restraint, however, being limited so as to permit a sufficient movement of the beam to effect circuit make and break action, as presently described.

The controller 100 for motor 24 may have any convenient position on platform 2. The various circuit wires are illustrated only diagrammatically in Fig. 3, as obviously they may be variously arranged to properly connect the trolleys, controller, motor, and circuit interruptions of the beam without interfering with the movements of the latter. The apparatus includes a motor circuit having reversible connections for effecting rotation of the motor in reverse directions, and two controller circuits adapted to control the motor circuit activity. A circuit make and break device is provided for each controller circuit, and these circuit devices are controlled by the beam movement in such manner as to prevent the controller from being operated in a direction which will result in moving the poise in any direction other than toward a point of balance. It will be understood that the controller may be variously constructed, no claim being made herein to the controller *per se*.

Referring to the diagram, Fig. 3, 40, 41 and 42 indicate the main circuit leads incident to a three-phase system, the same having appropriate connections through trolley pole 43 and trolleys 44 with conductors 45. The controller as here shown consists of a head or carrier 46 mounted to rotate about horizontal axis 47, the controller being moved in opposite directions by a handle 48 in opposition to springs 49. Carried by head 46 are the oppositely disposed segmental circuit plates 50 and 51 and the bridging plates $50'$ and $51'$. $b$ and $b'$ are contacts with which the upper portion of plate 50 coöperates, and $b^2$ and $b^3$ are similar contacts with which the upper portion of plate 51 coöperates, contacts $b'$ and $b^2$ being connected by conductor $b^4$. $c$, $c'$, $c^2$ and $c^3$ are fixed contacts with which the lower portions of plates 50 and 51 and bridging plates $50'$ and $51'$ coöperate in manner presently to be described, contacts $c$ and $c^3$ being connected by conductor $c^4$.

Rotatable with the controller is a head 52 provided at one side with shoulders 53 and $53'$ and at its opposite side with corresponding shoulders 54 and $54'$. 55 and 56 are solenoids located at opposite sides of head 52. The upper end of the core of solenoid 55 is operatively connected to a latch $55^a$, and its lower end is similarly connected to latch $55^b$. In like manner, the upper end of the core of solenoid 56 is connected to latch $56^a$ and its lower end to latch $56^b$. The main circuit lead 40 is connected to contact $b'$. Lead $f$ connects contact $b$ with the solenoid 55, and lead $f'$ extends from said solenoid to a make and break device represented by contacts $b^2$ and $b^3$; the circuit extending from the latter contact through lead $f^2$ to the main circuit lead 42, thus providing a circuit between two lines when contacts $b$ and $b'$ and contacts $d^2$ and $d^3$ are bridged.

The make and break device represented by contacts $d^2$, $d^3$, in Fig. 3, is supported by beam 11. A simple device for the purpose of the invention is shown in Fig. 5 as being in the form of a spring-actuated circuit closer 57 normally maintained in open-circuit position by its spring and adapted to be moved to close the circuit by a pivoted finger $57^a$ of the type of a bell crank lever, said finger having a portion $57^b$ also adapted to be engaged by latch 31. Such engagement may be had only when the beam 11 is tilted to depress the receptacle-supporting beam end, the finger being ineffective to move the circuit closer to make the circuit due to the presence of the spring of the closer. When the beam is tilted to the dotted line position of Fig. 1, latch 31 rides over hook 30 and the end of finger $57^a$ placing said finger beneath the latch so that whenever the beam is in the position shown in full lines in Fig. 5, the engagement of latch and finger moves the closer 57 to close the break between contacts $d^2$ and $d^3$. When the beam is moved to the dotted line position of Fig. 5, as when a preponderance of weight is on the receptacle end of the beam, the finger is released from the latch influence and the spring of the circuit closer operates the closer member to break the circuit. As a result, the circuit at this point is made only when the beam is tilted to cause engagement of hook 30 and latch 31, and provides automatic closing when the weight of the free end of the beam predominates, a condition provided as soon as any of the receptacle contents has been discharged.

At the right-hand side of the controller, contact $b^3$ is connected by lead $g'$ to solenoid 56, and from the latter extends lead $g^2$ to contact $d$ at the under side of the free extremity of the beam, and contact $d'$ is connected at $d^4$ to lead $f^2$ and from thence to main lead 42. Contacts $d$ and $d'$ are adapted to be bridged by latch 26 when in the position shown in Fig. 6, *i. e.*, when the free end of the beam is lightest, with roller 28 pressing upwardly on bar 25, the structure forming a make and break device at the free end of the beam. When, however, this upward pull or pressure is relieved, the counter-weighted latch tilts and opens the circuit at contacts $d$, $d'$.

The leads for motor 24 are as follows:— Main lead 42 is connected directly to the motor; main lead 41 is connected to contact $c^3$; and main lead 40 is connected with contacts $b^1$ or $b^2$ dependent upon the direction of controller movement. Extending from the motor are the two leads $h$ and $h'$, lead $h$ being connected to contact $c^2$, and lead $h'$ to contact $c'$.

When solenoids 55 and 56 are deënergized their positions are as indicated in full lines in Fig. 3, and when energized they are in the positions shown in dotted lines. These solenoids determine the movement of the controller, locking it against effective movement in either direction when beam 9 is in balance (both the make and break devices controlled by the beam being in circuit-breaking positions), and permitting the controller to be moved only in such direction as will cause an operation of the motor in such direction as will restore the balance after increasing or decreasing the load. When the weight of the receptacle-supporting end of the beam predominates, at time of engagement of roller 28 and bar 25, as when a retort has been discharged into receptacle 12, latch 26 pulls up hard against bar 25 and the circuit for solenoid 56 is closed at contacts $d$, $d'$. The result is that upon moving handle 48 to the right, the circuit is closed through main lead 40, contact $b'$, conductor $b^4$, contact $b^2$, conductor plate 51, contact $b^3$, and lead $g'$ to solenoid 56, and from the latter through lead $g^2$, contact $d$, latch 26, contact $d'$, lead $d^4$, and lead $f^2$ to main lead 42. The closing of this circuit causes the core of solenoid 56 to be moved to the dotted line position shown in Fig. 3 which places latch $56^a$ out of the path of shoulder 54, so that shoulder $54'$ may be lowered sufficiently to be engaged by latch $56^b$, in which position the controller is held notwithstanding springs 49. This movement of the controller places contact plate 51 in engagement with contact $c'$ and also causes plate $51'$ to bridge the contacts $c^2$ and $c^3$, thereby completing the following motor circuit:—main lead 40 to contact $b'$, conductor $b^4$, contact $b^2$, plate 51, contact $c'$ and through lead $h'$ to the motor. From the motor through lead $h$, contact $c^2$, plate $51'$, and contact $c^3$ to main lead 41. The resulting operation of the motor moves poise 21 toward the free extremity of the beam until it balances the load. The resulting slight depression of the free extremity of the beam relieves the upward pull of latch 26 on bar 25, and the counter-weighted latch then falls sufficiently to open the solenoid circuit at contacts $d$, $d'$, thus deënergizing solenoid 56, whereupon, the core of the solenoid drops, releasing hook $56^b$ from shoulder $54'$ and the controller is instantly restored to normal position by springs 49, this movement of conductor plates 51 and $51'$ opening the motor circuit and stopping the motor and the poise when the beam is in balance. The beam may then be readily moved by the operator as required, and with latch 26 free of bar 25 the beam may be swung into register with and tilted into producer-charging position.

The opposite balancing operation is as follows:—When the beam is tilted into the producer charging position shown in dotted lines in Fig. 1, hook 30 and finger $57^b$ engage the hooked latch 31, the latter being held in normal position by the counterweight $31^a$, the latch being provided with a handle-forming tail-piece $31^b$ for releasing it from hook 30. The beam has slight vertical play on the interlocking hooks 30 and 31, the tilting movement being limited by stop $11'$. When the beam is in fully tilted position, the circuit is broken at $d^2$, $d^3$, as previously explained, but when the load is wholly or partially discharged into the producer, the weight of the free portion of the beam predominates, causing finger $57^a$ to engage the latch 31, this latter engagement causing finger movement to close the circuit at contacts $d^2$ and $d^3$. The beam is now out of balance and the poise must be shifted toward the beam fulcrum to restore the balance. Consequently, controller 48 is moved to the left (movement to the right being prevented by the break in circuit for solenoid 56 at $d$ and $d'$), thereby closing the circuit of solenoid 55 through main lead 40, contact $b'$, plate 50, contact $b$, and lead $f$ to solenoid 55, and from the latter through lead $f'$, bridged contacts $d^2$ and $d^3$, and lead $f^2$ to main lead 42, raising the solenoid core. With the core thus raised, shoulder 53 may pass latch $55^a$ and shoulder $53'$ depressed into position to be engaged by latch $55^b$, the controller being thus held until solenoid 55 is deënergized. This movement of the controller completes the motor circuit as follows, said circuit reversing the connections of two of the motor leads from that above described, and of course resulting in a reverse operation of the motor. From main lead 40, contact $b'$, conductor plate 50, contact $c^2$, and lead $h$ to the motor, and from the motor through lead $h'$, contact $c'$, plate $50'$, contact $c$, conductor $c^4$, and contact $c^3$ to main lead 41. The resulting motor operation rotates screw shaft 22 in a direction to move the poise toward the lever fulcrum 10, and this movement is continued until the beam is again in substantial balance, a slight preponderance of weight on the receptacle-supporting beam end depressing that end to release the finger $57^a$ from returning the contacts $d^2$, $d^3$, bridged, thereby deënergizing solenoid 55 and the lowering of its core disengages latch $55^b$ from shoulder $53'$, whereupon the controller is restored to normal position by springs 49, resulting in opening the motor circuit, leaving the poise in beam-balancing position. The balanced beam is again in condition to be manipulated by the operator as may be required.

As will be seen, the beam 11 is operative in connection with two independent make and break devices, these devices being effective to close circuits non-concurrently, the change from one to the other being provided only by tilting the beam. Since each solenoid circuit requires the bridging of the contacts of the make and break device with which it is connected before the head 52 may be rotated a distance sufficient to close the motor circuit, it will be readily understood that an absolute selection of the direction of motor travel is provided by the beam itself, the bridging of contacts $d^2$, $d^3$ being prevented when the beam is in the position shown in full lines in Fig. 1, since finger $57^a$ is entirely removed from juxtaposition to latch 31, while bridging of contacts $d$ and $d'$ is prevented by the action of the counterweight 29 when the beam is in the position shown in dotted lines in Fig. 1. Consequently, the controller is movable only in a direction which will cause the motor to rotate the screw shaft 22 to thread the poise in a predetermined direction; since the motor circuits are so arranged as to cause this threading action to move the poise always toward a point of balance, it will be readily understood that, during the normal operation of the apparatus contemplated, in which the operator is required only to move the controller handle to start the operation, the mechanism itself providing the necessary retaining action, error on the part of the operator as to the direction of motor travel is prevented and movement of the poise is restricted toward a point of balance, the controller being automatically returned to a neutral position when such point of balance is reached or a slight reversal of weight preponderance is had, the latter automatically providing movements to the beam which will break the circuit at the make and break devices controlled by the beam movements. This requirement for an actual tilting operation of the beam to transfer the activity of one solenoid circuit to the other is also of advantage in that the operator is required to devote his attention to the beam shifting and tilting operations between successive manipulations of the controller in opposite directions. Obviously, successive manipulations of the controller in the same direction are prevented until load conditions are changed, since a movement of the beam to break a solenoid circuit at the beam make and break device places the beam in position to retain the circuit broken at such point, excepting, of course, the operator deliberately changes the normal operation of the apparatus through manually closing the circuit at such point by intentionally manipulating the beam or the make and break devices manually.

To prevent material over-running of the shaft 22, a suitable brake mechanism is employed, Fig. 7 showing a simple arrangement in which 70 designates a brake structure normally set and which is adapted to be released during the operation of the motor. To provide this action, a solenoid 71 is placed in the motor circuit, the movable member of the solenoid being operatively connected to the brake structure to release it when the solenoid is energized. The solenoid remains energized as long as the motor circuit is complete, being deënergized when breaking of the circuit is provided.

In order to weigh the coke transferred from the retorts or other fuel source, the poise actuating shaft 22 is geared to a register which is accurately adjusted for translating the rotations of the shaft into weight indications. The arrangement is preferably such that the register is actuated only when the poise is moved outwardly or toward the free extremity of the beam, such movement being had for accomplishing a balance only after coke has been discharged into receptacle 12, at other times the balance-attaining movements of the poise are toward the lever fulcrum, as will be understood.

Various forms of mechanisms, all well known in the art and for which no novelty is claimed, may be utilized for computing and registering or recording the weight, such apparatus being preferably of the cumulative type whereby the weight of each charge into receptacle 12, ascertained by balancing such charge, is added to the sum total of the previously registered weights. The registering or recording mechanism, indicated conventionally at 75, may be mounted in any suitable manner on the beam, being here shown superposed on motor 24, with its operating spindle 76 carrying a loose sprocket pinion 77 which is geared by chain 78 to sprocket wheel 79 mounted on screw shaft 22. A pawl and ratchet 80 provides an operative connection between spindle 76 and pinion 77 when shaft 22 is rotated in a direction to move poise 21 to balancing position after the coke is discharged into receptacle 12, such movement of the poise being toward the free extremity of the beam. The register is thus unaffected by the rotation of the screw shaft in the opposite direction which moves the poise toward the beam fulcrum, as when balancing the beam after the receptacle has been either wholly or partially emptied.

Of the various forms of well known registering or recording mechanisms available, one which records the condition of the register at certain time intervals may be employed, or one in which a time stamp or printing mechanism is operated whenever the register is operated, thereby making a record of the weight whenever a weight total has been ascertained, this being an obvious adaptation of familiar forms of computing and time recording mechanisms.

With the apparatus of the present invention the plant operator or manager may know with accuracy the amount of coke consumed by the producers, and if it appears that either too much or not enough is being used to accomplish the most economic and efficient results, the proper amount may be ascertained and the consumption held thereto. Also, the registrations may indicate the time intervals between successive charges. As gas generating plants operate continuously, the improved apparatus enables the manager to accurately check each shift of workmen.

What we claim is:—

1. In a producer charger adapted to convey charges from one level to another, the combination with a receptacle adapted to receive and having means to discharge loads, a rocking beam having an extended range of movement for supporting the receptacle, rotatable means carrying the rocking beam, a displaceable poise carried by the beam for balancing the receptacle, means for rendering said poise effective as a balancing factor in moving the receptacle between levels, and means for rendering said poise ineffective as such factor during the loading and unloading operations.

2. In a producer charger adapted to convey charges from one level to another, the combination with a receptacle adapted to receive and having means to discharge loads, a rocking beam for supporting the receptacle, rotatable means carrying the rocking beam, a displaceable poise carried by the beam for balancing the receptacle, electrically operated means mounted on the beam for moving the poise, means for retaining or locking the receptacle during loading and unloading operations and releasing the same when the receptacle has been balanced by the poise.

3. In a producer charger adapted to receive the charge in one position and deliver it in another position with the shifting movements provided manually, a receptacle for the charge, a beam mounted to rotate about a horizontal and a vertical axis with the receptacle connected thereto at one side of the beam axis, a beam-holding guide, means carried by the free portion of the beam for movably connecting with the guide, and a poise movable on the beam while said guide is active to balance the receptacle and eliminate the weight factor during manual shifting of the beam.

4. In a producer charger, the combination of a charging receptacle, a receptacle-supporting beam mounted to rotate about a horizontal axis for moving the receptacle vertically to and from a charging position, a poise movable on the beam for balancing the receptacle, a reversible electric motor carried by the beam and operatively connected to the poise, and means for directing the flow of current to the motor for causing the latter to always operate in a direction to move the poise into beam-balancing position, said means including circuit make and break devices located on opposite sides of the beam axis.

5. In a producer charger, the combination of a charging receptacle, a receptacle-supporting beam mounted to oscillate about a horizontal axis, a movable poise for the beam, a reversible electric motor operatively connected to the poise, a motor circuit having reversible connections, means for closing the motor circuit to provide motor operation in one direction when the receptacle is heavier than the poise weighted portion of the beam, and means for closing said circuits to provide motor operation in the opposite direction when the receptacle is lighter than the said portion of the beam, whereby under either condition the poise is moved in a direction to balance the beam, said circuits having make and break devices at opposite sides of the beam axis.

6. In a producer charger, the combination of a charging receptacle, a beam mounted to rotate about a horizontal axis with the receptacle connected thereto at one side of the beam axis, a poise movable on the beam at the opposite side of its axis, a reversible electric motor operatively connected to the poise, a motor circuit having reversible connections, two controller circuits adapted to control the motor circuit activity and having two interruptions in each controller circuit, a device actuated by the beam when the weight of its receptacle-supporting end predominates for closing one interruption of one controller circuit, a device operated by the beam when its poise portion predominates for closing one interruption of the other controller circuit, manually controlled means for closing the second interruption of each controller circuit, and means actuated upon the complete closing of a controller circuit for closing the motor circuit to provide motor operation in predetermined direction and for opening such motor circuit when an interruption occurs in its controller circuit.

7. In a producer charger, the combination of a charging receptacle, a beam mounted to rotate about a horizontal axis with the receptacle connected thereto at one side of the beam axis, means for holding the beam in tilted position when its receptacle-supporting portion is heavier than its free portion and with the receptacle-supporting portion in elevated position, a movable poise for the free portion of the beam, an electric motor operatively connected to the poise, a normally open motor circuit, and circuit closing means operative only when the beam is exerting stress on its holding means resulting from its receptacle-supporting portion being heavier than its free portion.

8. In a producer charger, the combination of a charging receptacle, a beam mounted to oscillate about a horizontal axis with the receptacle connected thereto at one side of the beam axis, a beam-holding guide, means carried by the free portion of the beam for movably connecting with the guide, a movable poise for the free portion of the beam, an electric motor operatively connected to the poise, a normally open motor circuit, and circuit closing means operative only when the beam is exerting upward stress on the guide.

9. In a producer charger, the combination of a charging receptacle, a beam mounted to oscillate about a horizontal axis with the receptacle connected thereto at one side of the beam axis, means for holding the beam in tilted position with the receptacle lowered for discharging, a movable poise for the free portion of the beam, an electric motor operatively connected to the poise, a normally open motor circuit, and circuit closing means operative only when the beam is exerting stress on its holding means resulting from its receptacle-supporting portion being lighter than its poise-weighted portion.

10. In a producer charger, the combination of a gas retort, a gas producer, a transfer receptacle adapted to receive coke from the retort and discharge the same into the producer, means for maintaining the position of the receptacle unaffected by load weight variations during charge receiving operations, means for moving the receptacle relatively to the retort and producer including a rocking beam having an extended range of movement and a rotatable support for the beam, adjustable receptacle balancing means, and means actuated by the movement of the balancing means for ascertaining the weight of the receptacle load.

11. In a producer charger, the combination of a receptacle, adapted to receive coke from a gas retort on one level and discharge the same into a gas producer on another level, a beam mounted for movements about a horizontal axis and a vertical axis with the receptacle operatively connected to the beam, a movable poise for the beam, poise adjusting means, and means adapted to be actuated by the poise adjusting means for ascertaining the weight of the receptacle load.

12. In a producer charger, the combination of a fuel charging receptacle, a receptacle support pivoted to swing vertically and horizontally, means for balancing the support on its horizontal pivot, and means for maintaining the position of the receptacle unaffected by load weight variations during the charge receiving and discharge operations and for providing a limited range of movement in the supply and delivery positions.

13. In a producer charger, the combination of a fuel charging receptacle, a receptacle support pivoted to swing vertically and horizontally between receptacle supply and delivery positions, means for balancing the receptacle prior to its movement between such supply and delivery positions, and means for maintaining the position of the receptacle unaffected by load weight variations during the charge receiving and discharge operations and for providing a limited range of movement in the supply and delivery positions.

14. In a producer charger, a material receiving receptacle, a support therefor movable between receptacle supply and delivery positions, the movements including a tilting action, means for balancing the receptacle prior to the tilting of the support, and means for maintaining the position of the receptacle unaffected by load weight variations during the charge receiving and discharge operations and for providing a limited range of movement in the supply and delivery positions.

15. In a producer charger, a material receiving receptacle, a support therefor movable between receptacle supply and delivery positions, means controlled by weight preponderance for balancing the receptacle prior to its movements between said positions, and means for maintaining the position of the receptacle unaffected by load weight variations during the charge receiving and discharge operations and for providing a limited range of movement in the supply and delivery positions.

16. In a producer charger, a material receiving receptacle, a support therefor movable between receptacle supply and delivery positions, the movements including a tilting action, means for balancing the receptacle prior to the tilting of the support, control mechanism for rendering said means active at opposite extremes of the tilting movement, and means for maintaining the position of the receptacle unaffected by load weight variations during the charge receiving and discharge operations and for providing a limited range of movement in the supply and delivery positions.

17. In a producer charger, a material receiving receptacle, a support therefor movable between receptacle supply and delivery positions, the movements including a tilting action, means for balancing the receptacle prior to the tilting of the support, control mechanism for rendering said means active when the support is at one extreme of its movement, said control mechanism being rendered inactive by the balancing of the receptacle, and means for maintaining the position of the receptacle unaffected by load weight variations during the charge receiving and discharge operations and for providing a limited range of movement in the supply and delivery positions.

18. In a producer charger, a material-receiving receptacle, a support therefor movable between receptacle supply and delivery positions, said movements including a support tilting action, means for restraining the movements of the support at predetermined points, said means permitting limited movements of the support at such points, and means operative to poise the receptacle while the support is under restraint and within such movement limiting sphere.

19. In a producer charger, a material-receiving receptacle, a support therefor movable between receptacle supply and delivery positions, said movements including a support tilting action, movement restraining elements coöperative with the support at its opposite extremes of tilting movement, said coöperative elements permitting a limited movement of the support at such points, and means operative to poise the receptacle while said elements are active.

20. In a producer charger, a material-receiving receptacle, a support therefor movable between receptacle supply and delivery positions, said movements including a support tilting action, movement-restraining elements coöperative with the support at its opposite extremes of tilting movement, and means operative to poise the receptacle while the support is under restraint, said elements including a fixed guide and a swinging member carried by the support and coöperative with said guide.

21. In a producer charger, a material-receiving receptacle, a support therefor movable between receptacle supply and delivery positions, said movements including a support tilting action, movement-restraining elements coöperative with the support at its opposite extremes of tilting movement, and means operative to poise the receptacle while the support is under restraint, said elements including a hook member carried by and movable with the support, and a pivoted latch member positioned in the path of movement of the hook.

22. In a producer charger, a material-receiving receptacle, a support therefor movable between receptacle supply and delivery positions, said movements including a support tilting action, movement-restraining elements coöperative with the support at its opposite extremes of tilting movement, and means operative to poise the receptacle while the support is under restraint, said elements including coöperating members engageable automatically and disengageable at will.

23. In a producer charger, a material-receiving receptacle, a support therefor movable between receptacle supply and delivery positions, said positions being at different vertical elevations, said movements including a tilting action of the support between such positions, means for controllably limiting the movements of the support in such positions, and means for poising the receptacle while the movements of the support are so limited.

24. In a producer charger, a material-receiving receptacle, a support therefor movable between receptacle supply and delivery positions, said positions being at different vertical elevations, said movements including a tilting action of the support between such positions, means for temporarily limiting the length of tilting movement when the support is in either of such positions, and means for poising the receptacle while the movements of the support are so limited.

25. In a producer charger, a material-receiving receptacle, a support therefor movable between receptacle supply and delivery positions, said positions being at different vertical elevations and out of vertical alinement, said support being movable on vertical and horizontal axes to permit movement of the receptacle from one position to the other, means for limiting the length of movement on the horizontal axis when the support is in either of such positions, and means for poising the receptacle while the movements of the support are so limited.

26. In a producer charger, a material-receiving receptacle, a support therefor manually movable between the receptacle supply and delivery positions, said positions being at different vertical elevations, said movements including a tilting action of the support, means for limiting the length of tilting movement when the support is in either of such positions, and means for poising the receptacle while the movements of the support are so limited, and means for rendering the poising means inactive during the manual tilting movements of the support.

27. In a producer charger, a material-receiving receptacle, a support therefor movable between receptacle supply and delivery positions, said support being pivotally mounted on a horizontal axis intermediate its ends, said positions being located on opposite sides of a horizontal plane extending through the support pivot, whereby a support end moves through such plane in passing from one position to the other, and means for poising the receptacle when the support is on either side of said plane.

28. In a producer charger, a material-receiving receptacle, a support therefor movable between receptacle supply and delivery positions, said support being pivotally mounted on a horizontal axis intermediate its ends, said positions being located on opposite sides of a horizontal plane extending through the support pivot, whereby a support end moves through such plane in passing from one position to the other, and means for poising the receptacle when the support is on either side of said plane, and means for rendering said poising means inactive during the manual tilting movements of the support.

29. In a producer charger, a material-receiving receptacle, a support therefor movable on a horizontal and a vertical axis between receptacle supply and delivery positions, means including a shiftable poise for poising said receptacle while in either position and means for controlling the poise-shifting movements by load variations in the receptacle, and means for providing a limited range of movement in the filling and discharging positions.

30. In a producer charger, a material-receiving receptacle, a support therefor movable on a horizontal and a vertical axis between receptacle supply and delivery positions, means including a shiftable poise for poising said receptacle while in either position and means for controlling the poise-shifting movements by load variations in the receptacle, the length of shifting movement of the poise in the load discharging position being dependent upon the amount of load discharge, and means for providing a limited range of movement in the filling and discharging positions.

31. In a producer charger, a material-receiving receptacle, a support therefor movable on a horizontal and a vertical axis between receptacle supply and delivery positions, means including a shiftable poise for poising said receptacle while in either position and means for controlling the poise-shifting movements by load variations in the receptacle, the direction of poise movement in one position of the support being opposite to the direction of its movement in the other position of the support, and means for providing a limited range of movement in the filling and discharging positions.

32. In a producer charger, a material-receiving receptacle, a support therefor movable on a horizontal and a vertical axis between receptacle supply and delivery positions, means including a shiftable poise for poising said receptacle while in either position and means for controlling the poise-shifting movements by load variations in the receptacle, said control means preventing movements of the poise in directions other than toward a point of balance, and means for providing a limited range of movement in the filling and discharging positions.

33. In a producer charger, a material-receiving receptacle, a support therefor movable on a horizontal and a vertical axis between receptacle supply and delivery positions, means including a shiftable poise for poising said receptacle while in either position and means for controlling the poise-shifting movements by load variations in the receptacle, and means for rendering said control means active solely when the support is in either of such positions, and means for providing a limited range of movement in the filling and discharging positions.

34. In a producer charger, a material-receiving receptacle, a support therefor movable between receptacle supply and delivery positions, means including a shiftable poise for poising said receptacle while in either position, said poise being shiftable in opposite directions to provide poising action, and means for controlling the poise shifting movements by load variations in the receptacle, said controlling means selectively determining the direction of poise travel, and means for providing a limited range of movement in the filling and discharging positions.

35. In a producer charger, a material-receiving receptacle, a support therefor movable between receptacle supply and delivery positions, receptacle poising means including a shiftable poise carried by the support, an electric motor and its circuit for shifting said poise in either direction, and control mechanism for said motor circuit, said mechanism being active solely when said support is in said positions, and means for providing a limited range of movement in the filling and discharging positions.

36. In a producer charger, a material-receiving receptacle, a support therefor movable between receptacle supply and delivery positions, receptacle poising means including a shiftable poise carried by the support, an electric motor and its circuit for shifting said poise in either direction, and control mechanism for said motor circuit, said mechanism including make and break devices carried by and movable with the support, and means for providing a limited range of movement in the filling and discharging positions.

37. In a producer charger, a material-receiving receptacle, a support therefor movable between receptacle supply and delivery positions, receptacle poising means including a shiftable poise carried by the support, an electric motor and its circuit for shifting said poise in either direction, and control mechanism for said motor circuit, said mechanism including make and break devices carried by and movable with the support, and means for rendering said devices active at predetermined positions of the support, and means for providing a limited range of movement in the filling and discharging positions.

38. In a producer charger, a material-receiving receptacle, a support therefor movable between receptacle supply and delivery positions, receptacle poising means operative when in either position and including a shiftable poise carried by the support, an electric motor and its circuit for shifting said poise in either direction, and control mechanism for said motor circuit, said mechanism including a pair of make and break devices for selectively controlling the direction of motor movement, and means for providing a limited range of movement in the filling and discharging positions.

39. In a producer charger, a material-receiving receptacle, a support therefor movable between receptacle supply and delivery positions, receptacle poising means including a shiftable poise carried by the support, an electric motor and its circuit for shifting said poise in either direction, and control mechanism for said motor circuit, said mechanism including a pair of make and break devices carried by and movable with said support for selectively controlling the direction of motor movement, and independent mechanism for each device adapted to coöperate therewith to render the device active, and means for providing a limited range of movement in the filling and discharging positions.

40. In a producer charger, a material-receiving receptacle, a support therefor movable between receptacle supply and delivery positions, receptacle poising means including a shiftable poise carried by the support, an electric motor and its circuit for shifting said poise in either direction, and control mechanism for said motor circuit, said mechanism including a pair of make and break devices carried by and movable with said support for selectively controlling the direction of motor movement, said latter mechanisms acting as support movement-restraining elements when the support is in such positions, and means for providing a limited range of movement in the filling and discharging positions.

41. In a producer charger, a material-receiving receptacle, a support therefor movable between receptacle supply and delivery positions, receptacle poising means including a shiftable poise carried by the support, an electric motor and its circuit for shifting said poise in either direction, and control mechanism for said motor circuit, said mechanism including make and break devices carried by and movable with the support, said devices determining the direction of motor movement, said control mechanism also including a motor circuit make and break device controlled by said support-carried devices, said support-carried devices automatically effecting make and break action by weight preponderance.

42. In a producer charger, a material-receiving receptacle, a support therefor movable between receptacle supply and delivery positions, receptacle poising means including a shiftable poise carried by the support, an electric motor and its circuit for shifting said poise in either direction, and control mechanism for said motor circuit, said mechanism including make and break devices carried by and movable with the support, said devices determining the direction of motor movement, said control mechanism also including a motor circuit make and break device controlled by said support-carried devices, said support-carried devices automatically effecting make and break action by weight preponderance, said motor circuit devices being manually operable when either support-carried device is in circuit making position.

In testimony whereof we affix our signatures in presence of two witnesses.

HENRY A. CARPENTER.
ARTHUR W. WARNER.

Witnesses:
M. J. STEELE,
ADA M. STEELE.